Nov. 17, 1970  R. G. FOSS  3,540,328
APPARATUS FOR TAPERING ENDS OF LAMINATED PLASTIC PIPE
Filed Sept. 3, 1968  4 Sheets-Sheet 1

INVENTOR.
Rudolph George Foss
BY
ATTORNEY.

Nov. 17, 1970      R. G. FOSS      3,540,328

APPARATUS FOR TAPERING ENDS OF LAMINATED PLASTIC PIPE

Filed Sept. 3, 1968      4 Sheets-Sheet 3

INVENTOR.
Rudolph George Foss

BY

ATTORNEY.

Nov. 17, 1970   R. G. FOSS   3,540,328
APPARATUS FOR TAPERING ENDS OF LAMINATED PLASTIC PIPE
Filed Sept. 3, 1968   4 Sheets-Sheet 4

INVENTOR.
Rudolph George Foss

United States Patent Office 3,540,328
Patented Nov. 17, 1970

3,540,328
APPARATUS FOR TAPERING ENDS OF
LAMINATED PLASTIC PIPE
Rudolph George Foss, Tulsa, Okla., assignor to Ciba
Corporation, a corporation of Delaware
Filed Sept. 3, 1968, Ser. No. 756,784
Int. Cl. B23b 5/16
U.S. Cl. 82—4                                                          9 Claims

ABSTRACT OF THE DISCLOSURE

An apparatus is provided for tapering the ends of laminated plastic pipe which has a stationary central shaft with means to hold the pipe to be tapered in a fixed position, and a cutter which is mounted to rotate and advance about the pipe at a predetermined angle to cut a predetermined taper on the end of the pipe. The apparatus of this invention may be either manually operated or power operated.

BACKGROUND OF THE INVENTION

This invention relates to an apparatus for tapering the ends of laminated plastic pipe. More particularly, this invention is concerned with a tapering tool which can be either manually or power operated which will cut a taper of a predetermined angle on the end of laminated pipe without delaminating the pipe.

Laminated plastic pipe, such as filament wound fiberglass reinforced epoxy pipe, is utilized in a large number of industrial applications. The pipe is used, for example, in oil fields and in chemical plants because of its excellent resistance to corrosion, its strength and light weight. The installing of pipe systems using laminated plastic pipe has been somewhat difficult because of the techniques employed in making the pipe joints. Since the laminated plastic pipe is generally of a thin wall construction, the joints are made by tapering the ends of the pipe and bonding the pipe and fitting together with an adhesive such as an epoxy resin. The degree of taper that is cut on the end of the pipe must be cut accurately in order to mate properly with the pipe fitting. The cutting of the taper has presented a number of problems which have slowed the installation and increased the cost of installing laminated plastic pipe systems.

DESCRIPTION OF THE PRIOR ART

In order to accurately cut the taper it was suggested to taper the pipe ends in the shop using conventional stationary shop equipment. This necessitated that the pipe size requirements for a given installation be accurately estimated and the pipe cut and tapered before being taken to the job site. There were, of course, many errors made in estimating the exact requirement, which considerably slowed installation rates, since additional parts had to be made in the shop and brought to the job site.

Several portable tools were suggested which could be used in the field. The tools heretofore suggested have several disadvantages. Certain of the tools would not consistently cut the taper with the desired angle of taper. The tools further have the tendency to delaminate the pipe as they cut the taper. Certain of the tools previously suggested required a relatively skilled machinist to adjust them and were readily put out of adjustment by rough handling. Since the tools must be operable by relatively semi-skilled operators, and are subject to considerable abuse in the field, the above-described tools were not satisfactory.

Most of the tapering tools heretofore suggested were either operated manually or were power operated. Since power is often not available at the job site, this required that two tools be purchased, one for use when power is available, and one for use when the tool must be manually operated. In addition, it should be noted that the manually operated tools were generally unsatisfactory because of the relatively large amount of force required to operate the tools.

Another disadvantage of the portable tools heretofore suggested was that they could not cut taper-to-taper or very short pipe nipples. This was a serious disadvantage in that the short nipples are used in relatively large numbers in certain types of pipe installations.

It is an object of the present invention to overcome the aforementioned problems and disadvantages.

It is another object of this invention to provide an apparatus for accurately cutting tapers on laminated plastic pipe which is portable, may be either manually or power operated, and is simple to operate under field conditions.

It is an additional object of this invention to provide a tapering tool which will cut tapers on short lengths of pipe.

Other objects and advantages of this invention will become further apparent from an examination of the drawings and a reading of the attached specification and appended claims.

SUMMARY OF THE INVENTION

The objects of this invention are achieved by providing an apparatus having stationary and movable sections. The stationary section includes a shaft which has a pipe gripping means mounted on one end and is threaded on the opposite end. The movable section includes a mounting pulley which is positioned on the shaft and is adapted to rotate about the shaft. The mounting pulley in combination with a guide and a tool holder holds a cutter at a predetermined angle. The tool holder is also linked to the thread on the shaft so that when the pulley is rotated the cutter is both rotated and advanced so as to cut the desired taper on the pipe which is held by the pipe gripping means. An extension shaft is provided which can be attached to the apparatus to facilitate the tapering of short lengths of pipe.

Figure 1:
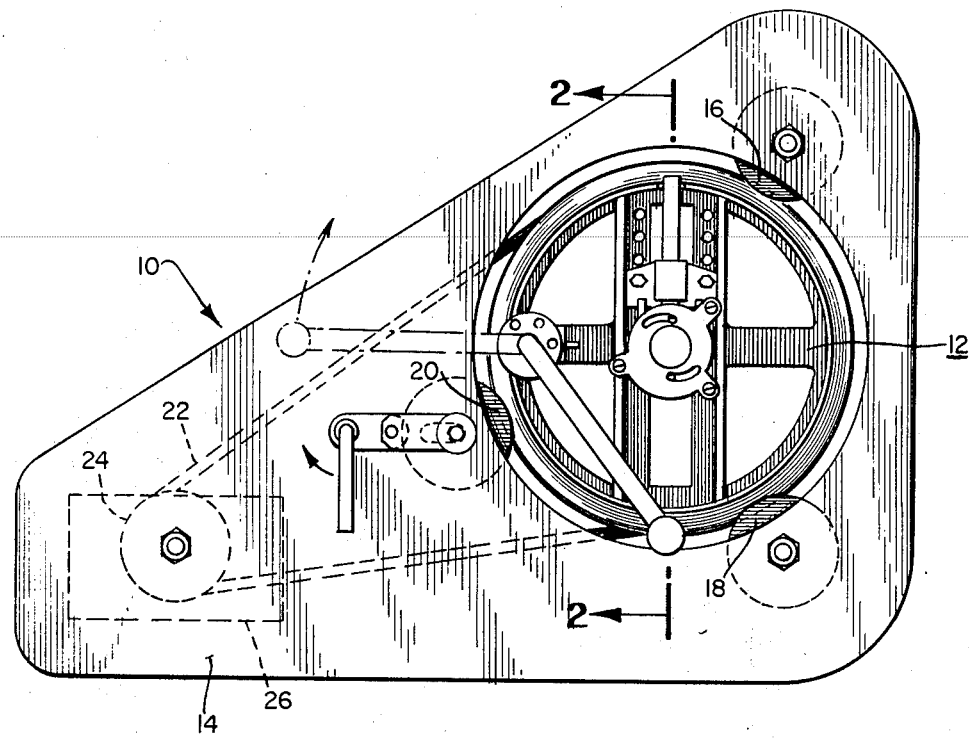
FIG. 1 is an end view of the apparatus constructed in accordance with the teaching of this invention which is shown in an embodiment adapted for either manual or power operation.
Figure 9:
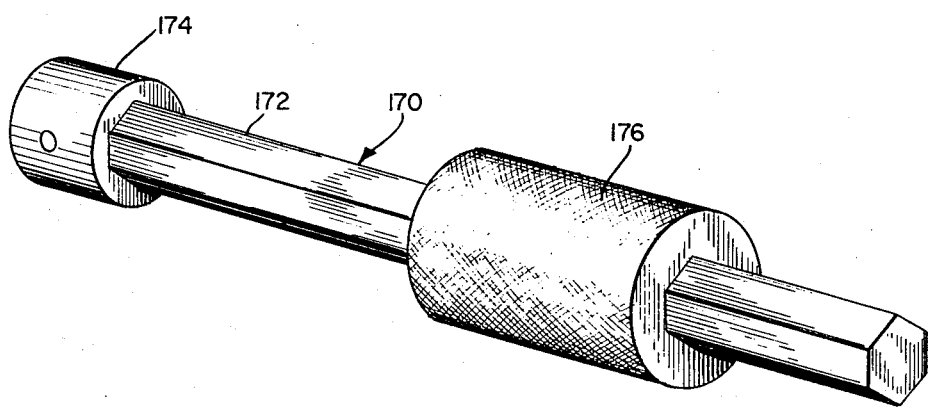
FIG. 9 is an illustration of the extension used with the apparatus of the present invention.
Figure 2:
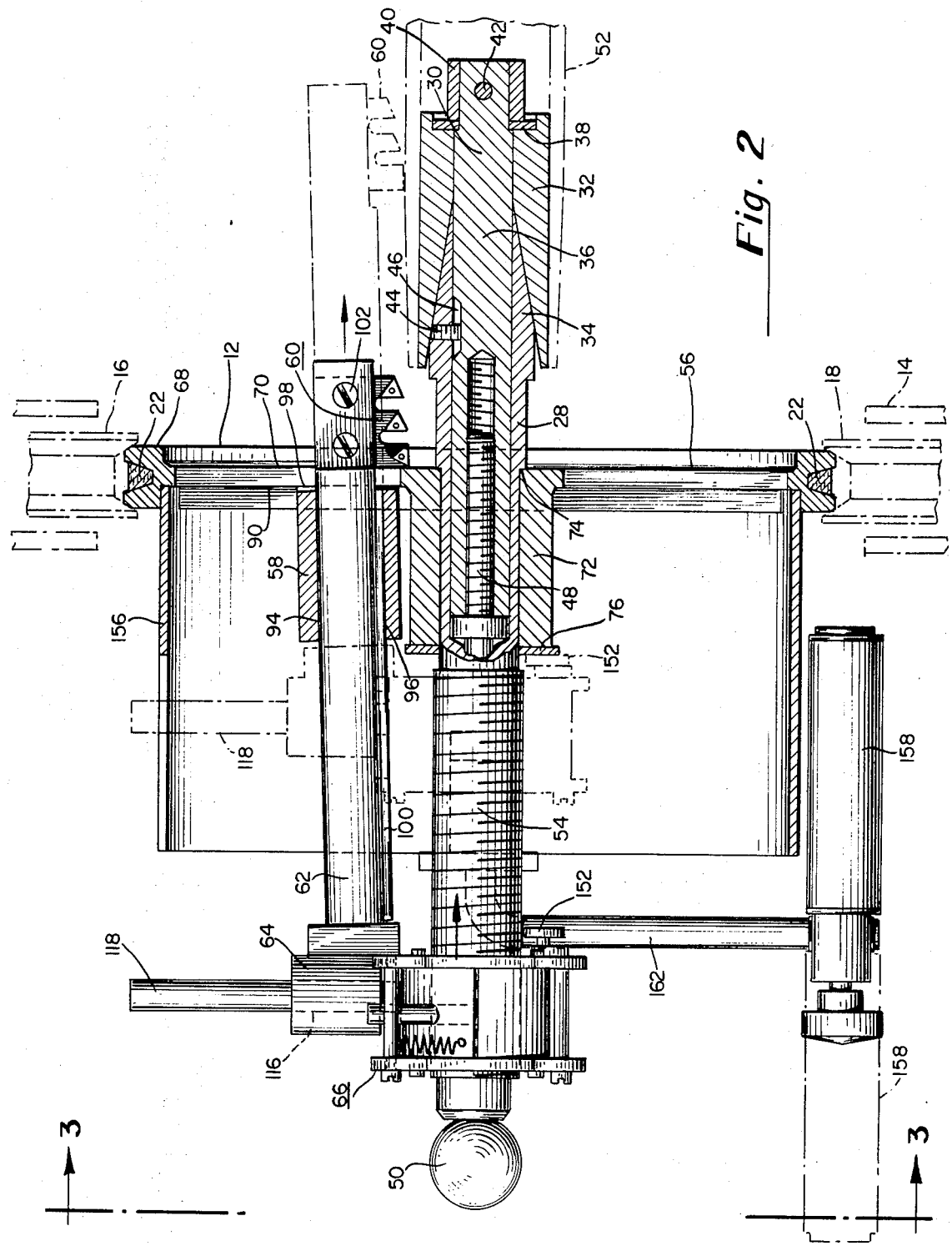
FIG. 2 is a side view in section taken as indicated by the lines and arrows 2—2 of FIG. 1.
Figure 3:
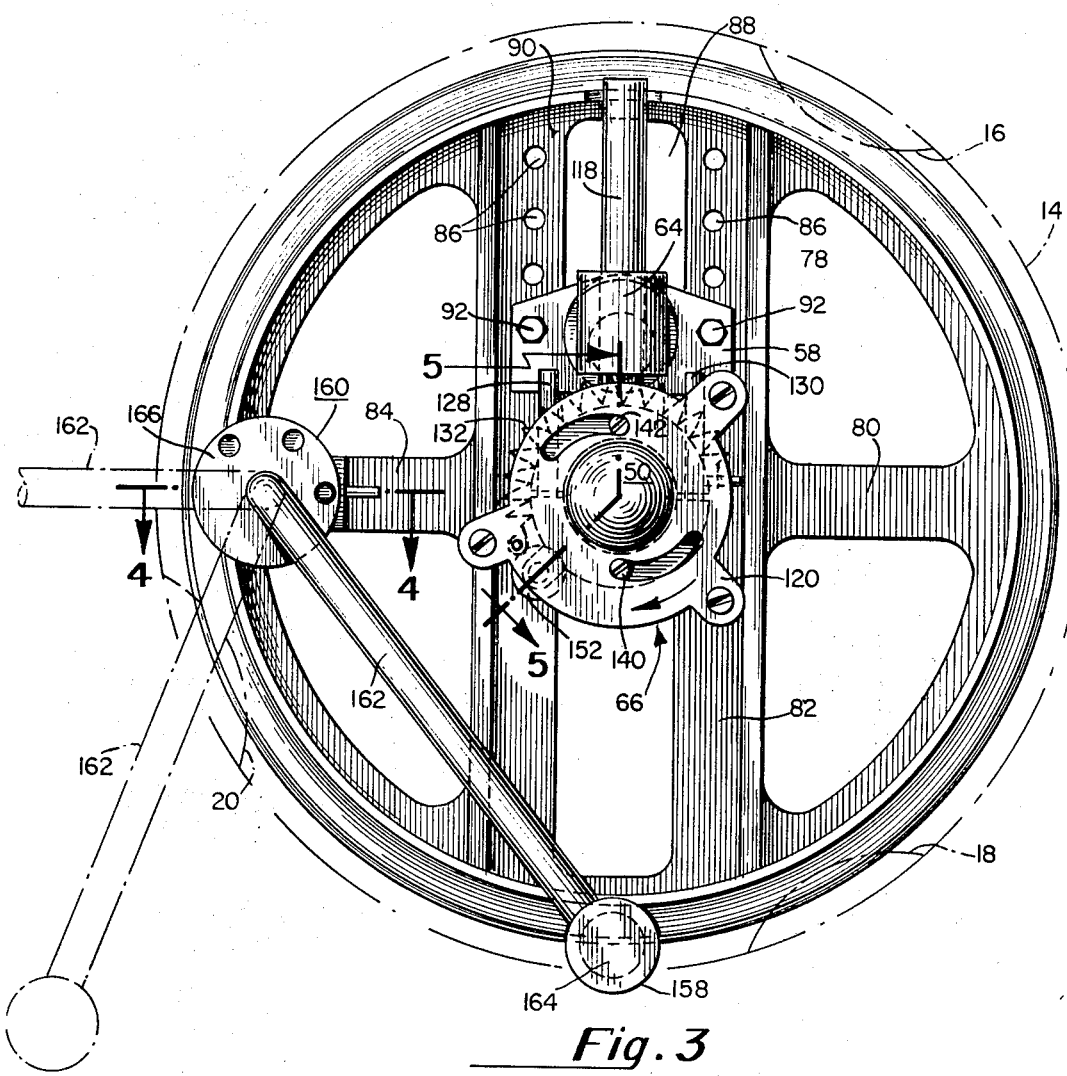
FIG. 3 is an end view taken as indicated by the lines and arrows 3—3 of FIG. 2.
Figure 5:
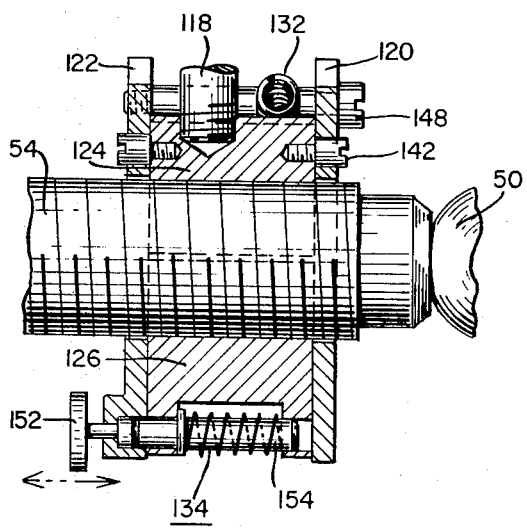
FIG. 5 is a sectional view taken as indicated by the lines and arrows 5—5 of FIG. 3.
Figure 4:
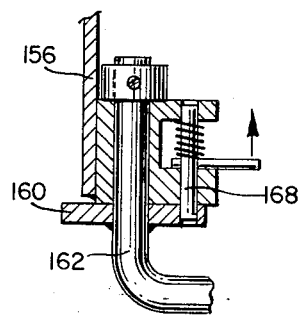
FIG. 4 is a sectional view taken as indicated by the lines and arrows 4—4 of FIG. 3.
Figure 6:
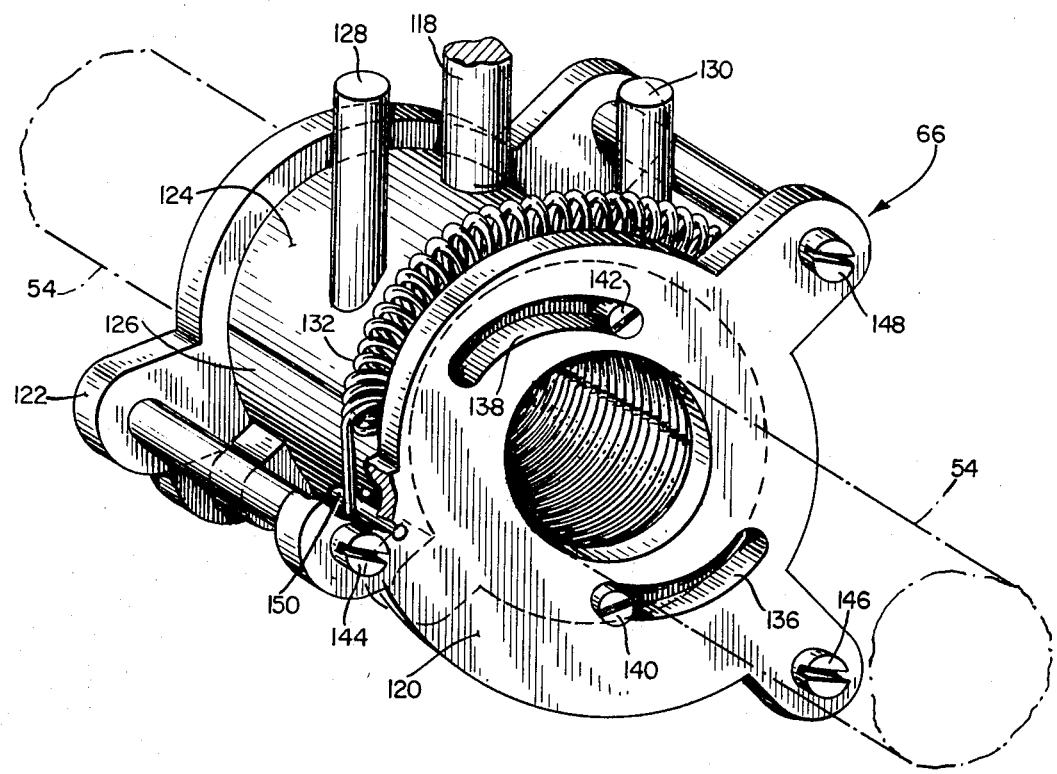
FIG. 6 is a perspective illustration in partial cross-section of the releasable thread engaging means of the apparatus of the present invention.
Figures 7, 8:
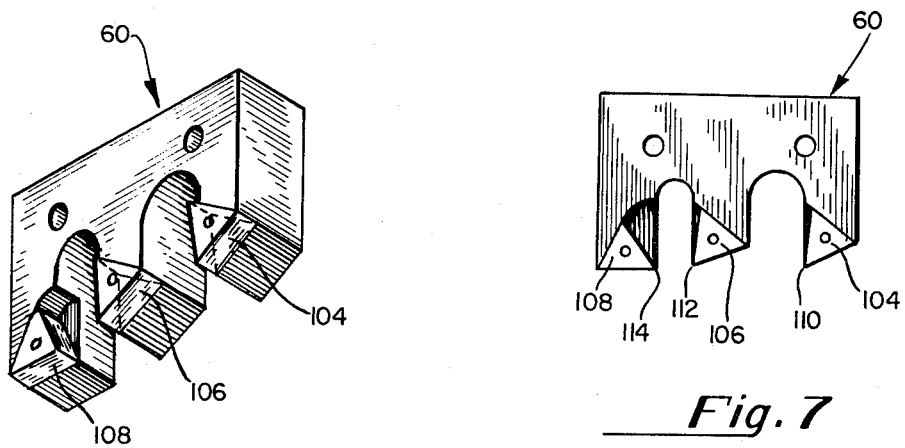
FIG. 7 is a side elevation of the cutter employed with the apparatus made in accordance with the teaching of the present invention.
FIG. 8 is a perspective view of the cutter illustrated in FIG. 7.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DESCRIPTION OF THE PREFERRED EMBODIMENTS

Turning now to the specific embodiments of the invention selected for illustration in the drawings, the number 10 generally designates the apparatus of the invention. The apparatus 10 is comprised of two main parts, the tapering tool 12 and the power frame 14. The tapering tool 12 is held in the frame 14 by the guide pulleys 16, 18, 20. The tapering tool 12 is locked in the frame 14 by the movable pulley 20. A drive belt 22 is engaged with the tapering tool 12 and is driven by the drive pulley 24 which in turn is driven by a power source 26, such as an electric motor. It should be noted that the tapering tool 12 can readily be removed from the frame 14 by simply releasing the movable pulley 20 and operated manually. The tapering tool 12 can also be operated either manually or with the power source 26 while still in the frame 14.

The tapering tool 12 is comprised of two main portions, a stationary and a movable portion. The stationary portion is comprised of a hollow main shaft 28. On one end of the shaft 28 a pipe gripping means 30 is mounted concentrically with the shaft 28. The pipe gripping means 30 has an expandable collet 32 which is positioned on the conical end 34 of the shaft 28. The collet 32 is attached to a first end of the slideable member 36 by the washer 38, the lock ring 40, and the lock pin 42. The slideable member 36 is prevented from rotating by the set screw 44 in cooperation with an elongated slot 46 in the slideable member 36. The opposite end of the slideable member 36 is threadedly engaged with a threaded rod 48. The threaded rod 48 at its opposite end is connected with collet control 50. When the collet control 50 is turned, the slideable member 36 is either advanced or retracted depending on the direction the collet control 50 is rotated, thereby either loosening or tightening the collet 32. When the collet 32 is unexpanded, a pipe 52 is slipped over the collet 32. The collet is then expanded by turning the collet control 50 until the pipe 52 is firmly held in place. It should be carefully noted that the use of an expanding collet of the type shown is an important feature of the invention in that it holds the laminated pipe 52, which is somewhat flexible, in a right cylindrical shape during tapering. If the pipe 52 is not held in the proper shape, the resulting taper will not be uniform all around the pipe 52.

The opposite end of the shaft 28 from the end at which the collet 32 is mounted has a thread 54 defined on the outer surface thereof. The thread 54 can be cut in the surface of the shaft 28 or may be formed by securing, for example, by welding a threaded tube on the outer surface of the shaft 28. The use of the threaded tube is preferred in that it facilitates the initial assembly and repair of the tapering tool 12. The thread 54 is of a length which is sufficient to permit the cutter to advance at least the entire length of the taper to be cut, as will be explained below.

The rotatable portion is comprised of a mounting pulley 56, a guide 58, a cutter 60, a tool holder 62, a mounting bracket 64, a releasable thread clamping means 66, and a driving means.

The pulley 56 is an integral unit comprised of a rim 68, a web 70, and a hub 72. The pulley 56 is mounted on the shaft 28 and is adapted to rotate perpendicular about the major axis of the shaft 28. The pulley 56 is locked at a fixed distance from the ends of the shaft 28, the hub 72 being restricted in its forward movement by the shoulder 74 of the shaft 28 and in its rearward movement by the locking ring 76.

The rim 68 as illustrated is shown in a configuration which is suited for receiving a V belt 22. The rim 68 could likewise be modified to be driven by other means, such as a chain drive, or could also be gear driven.

The web 70 may advantageously be comprised of a plurality of spokes 78, 80, 82, 84. At least one section of the web 70, for example, one of the spokes 78, is adapted to hold the guide 58 in a predetermined position, whereby the tool holder 62 with the cutter 60 attached is guided at a predetermined angle. The spoke 78 has pairs of matched holes 86 extending radially along an elongated aperture 88 in the spoke 78. The holes 86 are located at distances from the central axis of the shaft 28 which correspond to the diameter of the pipe to be cut. For example, one set of holes is used for 2" pipe and another for 3" pipe, and so forth. The surface of the spoke 78 having the holes 86 and the aperture 88 is referred to herein as the mounting surface 90. The mounting surface 90 is cut so that the plane of rotation is perpendicular to the central axis of the shaft 28.

The guide 58 is securely bolted to the mounting surface 90 by bolts 92. The guide 58 has a hole 94 extending its entire length and a keyway 96. The hole 94 and keyway 96 are of a configuration such as to receive the tool holder 62 in a sliding mating relationship which will allow only reciprocal movement.

The forward surface of the guide 58, which is secured to the mounting surface 90, is cut at a slight obtuse angle of about 91.5° to about 92°, for example, with respect to the direction in which the tool holder is guided by the guide 58. Accordingly, when the guide 58 is bolted securely to the mounting surface 90 which rotates perpendicular to the axis of the shaft 28, the guide 58 guides the tool holder 62 at an angle corresponding to the angle of the forward surface 98 of the guide 58. For example, when the angle of the forward surface is cut at 92°, the tool will be guided at a 2° angle with respect to the central axis of the shaft 28. Since the pipe gripping means 30 is mounted concentrically on the shaft 28, it will be guided at the same angle with respect to the pipe 52 being held by the pipe gripping means 30.

In an alternate embodiment included within the scope of the present invention, the same result as noted above is obtained by forming the mounting surface 90 so that it rotates in an obtuse plane with respect to the central axis of the shaft 28 and having the forward surface 98 cut perpendicular to the path of the tool travel.

The tool holder 62 is a straight bar. As illustrated, it is round, has a key 100. The tool holder 62 moves reciprocally in the guide 58 with the key 100 in combination with the keyway 96 preventing rotation of the tool holder 62. The tool holder 62 passes through the aperture 88 in the spoke 78.

At an end of the tool holder 62 the cutter 60 is secured by the screws 102. The cutter 60 has a plurality of bits 104, 106, 108. The bits 104, 106, 108 are removable and are triangular in shape so that they can be turned in order to present new cutting edges as the edges in use become dull. The bits are preferably made of a hard material such as tungsten carbide. The first cutting bits 104, 106 are set at a negative rake angle, while the final bit 108 is set at a positive rake angle. When the cutter 60 is secured to the holder 62, the cutting edges 110, 112, 114 are aligned with each other and positioned so as to move in a line parallel to the line of travel of the tool holder 62.

An important feature of the cutter of the present invention is that the cutter has a plurality of pointed bits so that there is a minimal amount of cutter contact with the pipe 52, which makes it easier to turn the tapering tool. The initial bits, being set at a negative rake angle, both help reduce the force required to cut the taper and help prevent delamination of the pipe. The final bit 108 is set at a positive rake angle in order to have a final cut which finishes and smooths the surface of the taper. The final bit 108 does not cut a substantial amount of the taper since the first two bits 104, 106 do almost all of the cutting of the taper.

In the prior art one lone blade-type bit was employed which, because of the relatively large tool contact area, was difficult to move and had a tendency, because of the greater pressure required to rotate the bit, to delaminate the pipe during tapering.

The tool holder 62 is secured at the end opposite the end at which the cutter 60 is attached to a mounting bracket 64. The mounting bracket has a hole 116 through which the stud 118 passes. The mounting bracket 64, the tool holder 62 and the cutter 60 are attached together so as to form a single unit. When this unit is secured to the mounting pulley 56 by the guide 58 and the mounting pulley 56 is rotated, the combination of the pulley 56, the guide 58, the tool holder 62, and the mounting bracket 64 cause the stud 118 to likewise rotate about the shaft 28.

The stud 118 is attached to the releasable thread clamp 66. The thread clamp 66 is comprised of guide plates 120, 122, upper and lower threaded members 124, 126, guide pins 128, 130, a spring 132, and a locking means 134. The guide plates 120, 122, which are substantially identical to each other, have eccentric slots 136, 138. The following pins 140, 142 pass through the eccentric slots 136, 138 and are screwed in the upper and lower threaded members 124, 126.

The threaded members 124, 126 have internal threads which mate with the thread 54 on the shaft 28. The guide plates 120, 122 and the threaded members 124, 126 are held together by the bolts 144, 146, 148. The spring 132 is attached at its first end to one of the guide plates 120 by a pin 150 and at its opposite end to the lower threaded member 126. When the thread clamp 66 is engaged with the thread 54, the spring 132 is under tension. If the clamp 66 is not locked in place, the spring 132 urges the guide plates 120, 122 to rotate with respect to the threaded members 124, 126. The following pins 140, 142 follow the eccentric slots 136, 138 and cause the upper and lower threaded members 124, 126 to separate from each other with the upper member 124 riding up on the guide pins 128, 130.

The thread clamp 66 is held in the engaged position by the lock means 134 which is comprised of a push button 152 and a spring loaded pin 154. The push button 152 is attached to the guide plate 122 while the spring loaded pin 154 is mounted in the lower threaded member 126. In the locked position the spring loaded pin 154 extends into the guide plate 122 and thereby prevents release of the thread clamp 66. The clamp is released by depressing the push button 152. This can be done by contact with the hand or is done automatically when the push button 152 contacts the locking ring 76. The clamp 66 is re-engaged by simply gripping the guide plates 120, 122 and turning them until the lock means 134 is engaged.

A guard 156 is secured as by welding to the rim 68 of the mounting pulley 56 and extends toward the collet control 50. The guard 156 has a dual function. It serves as a guard to prevent injury to the tool operator and as an extension for the manual driving means. A handle 158 is attached to the guard 156. The handle 158 is comprised of a lock 160, a lever 162 and a grip 164.

The lock 160 is comprised of a disc 166 having a number of holes in it and a spring loaded locking pin 168. The pin 168 in combination with the plate holds the handle 158 in certain predetermined positions. In a first position the handle is held at a position extending outward perpendicular to the tapering tool 12. This is the position employed for normal manual operation since maximum leverage is obtained with the handle 158 in this position. A second manual position is provided wherein the handle is locked at a tangential position. This is used in situations wherein there is a limited amount of working space as, for example, in a narrow ditch. In a third position the handle is locked in a position wherein the lever 162 can be considered as defining a chord with respect to the rim 68 of the mounting pulley 56. This is the position used when the aparatus 10 is to be power operated. This position increases the safety of the apparatus. In addition, the grip 164, which is weighted, may be folded inward, and in combination with the remaining part of the handle 158, acts as a counterbalance which permits high rotational speeds when the tool is power driven.

An extension 170 is provided which may be attached to the tapering tool 12 when it is necessary to cut taper-to-taper or short pipe nipples. The extension 170 consists of a bar 172, an adapter 174, and a knurled grip 176. The knurled grip 176 is slideable but not rotatable on the bar 172. The adapter 174 is the same size as the lock ring 40 and takes its place when the extension 170 is employed.

In operation an expandable collet 32, which is a size suitable for holding the pipe 52 which is to be tapered, is secured to the shaft 28 with the washer 38, the lock ring 40 and the lock pin 42. The collet 32 is released, if necessary, by the collet control 50. The thread clamp 66 is released by pushing the push button 152 and is pulled back to a position adjacent to the collet control 50 and then locked into position on the thread 54 by turning the guide plates 120, 122. Since the cutter 60 and the tool holder 62 are linked with the thread clamp 66 by the stud 118 and the mounting bracket 64, the cutter 60 is also drawn back to the starting position. The guide 58 is secured to the appropriate set of holes 86 for the diameter of the pipe to be tapered, and the bracket 64 is simultaneously positioned on the stud 118. The pipe 52 is held in a suitable vise (not shown) and the collet 32 is expanded until the pipe is securely gripped. The mounting pulley 56 is rotated either manually by the handle 158 or is rotated by a power source 26. The cutter 60 is held at a predetermined angle, as noted above, and is rotated and advanced about the pipe 52 to be tapered. When the taper is completed, the cutter will advance until the push button 152 contacts the lock ring 76 and releases the thread clamp 66. The pulley is stopped and the clamp 66 is drawn back and engaged with the thread 54. The collet 32 is released and the tapered pipe 52 is removed.

When taper to taper or short pipe nipples are to be cut, the same general procedure is followed with the exception that the extension 170 is used in place of the lock ring 40. The knurled member 176 is clamped in the vise and the short pieces of pipe are then locked in place for tapering by the collet 32.

The advantages of the apparatus 10 of this invention are numerous, especially under working conditions found in oil fields and in chemical plants. The apparatus 10 is portable and is constructed so as to absorb considerable amounts of abuse. The apparatus 10 may be readily operated manually or may be power operated. The apparatus 10 may be operated manually while still in the power frame 14 by simply turning the handle so as to turn both the tool and the power source, such as an electric motor. It should be noted that it is relatively easy to manually turn an electric motor when the power is off. Also, it should be noted that, if the apparatus is to be used extensively in an area where it must be manually operated, the tapering tool 12 can be readily separated from the frame 14 by releasing the movable pulley 20 and removing the tapering tool 12 from the frame 14.

An additional advantage is that the tapering tool can readily be accurately set up for different diameter pipe by even semiskilled workers. The tool is simple to operate and the resulting tapers are accurately cut to a given degree of taper without delaminating the pipe.

The cutter 60, because of its unique structure, having a plurality of points at which the initial bits are set at negative rake angles, reduces the power required to operate the tool.

Another advantage of the present apparatus can be seen in the safety features which also function to increase the efficiency of the apparatus 10. Of particular attention in this regard is the handle 158 which, when locked in the power operating position is out of the way of the operator and acts as a counterbalance to permit higher speed operation.

An important feature of this invention is that the apparatus 10 with the extension 170 attached can be used to cut very short nipples, including taper to taper nipples.

It is to be understood that the forms of the invention herewith shown and described are to be taken as preferred embodiments. Various changes may be made in the shape, size and arrangement of parts. For example, equivalent elements may be substituted for those illustrated and described herein, parts may be reversed and certain features of this invention may be utilized independently of the use of other features, all without departing from the spirit or scope of the invention as defined in the subjoined claims. For example, the pulley 56 can be cast with guides at each set of holes rather than employing a movable guide 58 as illustrated. The tapering tool 12 can, of course, be utilized by itself without the power frame 14 if only manual operation is desired. The means to power drive the tapering tool 12 can be modified as noted above from a V belt to chain drive, or a gear drive or other equivalent means, and the shape of the power frame can likewise readily be modified to other than the general triangular shape that is illustrated. It should also be noted that other sections of the web can be adapted to receive and hold the cutter and tool holder in a manner similar to that described. If desired, the additional mounting surface on the pulley can be made so as to hold the tool at a different angle of taper by simply changing the angle of inclination of the mounting surface with respect to the central axis of the shaft 28. These and other modifications of this invention which would be obvious to those of ordinary skill in the art after reading the above are included within the scope of the present invention.

I claim:

1. An apparatus for cutting tapers of a predetermined angle on the ends of laminated plastic pipe of a given diameter, said apparatus comprising in combination: a stationary portion and a rotatable portion; said stationary portion comprising a shaft having a central axis and internal pipe gripping means, said pipe gripping means being concentrically mounted at a first end of said shaft, said shaft having a thread defined on the outer surface thereof at the opposite end from said pipe gripping means; said rotatable portion comprising a mounting pulley, a guide, a cutter, a tool holder, a releasable thread clamping means, and a driving means; said mounting pulley having a rim, a web, and a hub, and being positioned on the shaft between the pipe gripping means and said thread at a fixed distance from the first end of said shaft and being adapted to rotate about said shaft in a plane perpendicular to the central axis of said shaft, said web having a mounting surface defined therein including an aperture extending through said web and means for securing the tool guide to the mounting surface at a predetermined radial distance from the central axis, which distance is dependent on the given diameter of the pipe, said guide being secured to said mounting surface, said tool holder having first and second ends and being slideably engaged for reciprocal movement through said guide, and passing through the aperture of the web, said cutter being secured to a first end of said tool holder, adjacent said pipe gripping means, said tool holder in combination with said guide and mounting surface guiding said cutter at said predetermined angle with respect to the pipe gripping means; at the second end of said holder, adjacent said threaded portion, said tool holder being linked with said thread clamping means, said thread clamping means being positioned about and adapted to mate with said thread on the shaft, and driving means being attached to said mounting pulley whereby when said thread clamping means is engaged with the thread and the mounting pulley, and is rotated by said driving means, the cutter is rotated and advanced at a said predetermined angle about said pipe being held by the pipe gripping means so as to cut the taper of said predetermined angle on the end of said pipe.

2. The apparatus according to claim 1 wherein said cutter has a plurality of pointed cutting bits, the initial cutting bits of said cutter being set a a negative rake angle and the final cutting bit of said cutter being set at a posiive rake angle with respect to said predetermined angle of said taper.

3. The apparatus according to claim 1 wherein said drive means is comprised of a handle and attaching means; said handle having a lock means, a lever, and a grip, said lever being connected at a first end with said lock means and at its opposite end with said grip; the lock means of said handle being connected to said pulley by said attaching means, said lock means being adapted to hold said lever and grip in a plurality of predetermined positions, in the first of said positions said lever extending outward from said central axis and in a second of said positions said lever and grip extending inward toward said central axis and being locked in a counterbalancing position with respect to said cutter, guide and tool holder, whereby when said handle is in said first position additional leverage is available for manual operation and when said handle is locked in said second position the counterbalancing effect enables the apparatus to be power operated at relatively higher rotational speeds.

4. The apparatus according to claim 3 where said drive means is further comprised of a frame in which said pulley is secured and is free to rotate, a drive transmission means and a motor means, said motor means being secured to said frame, said transmission means being engaged with both the rim of the pulley and with said motor means, whereby when said motor means is activated said pulley is rotated by said motor means in said frame.

5. The apparatus according to claim 1 wherein said releasable thread engaging means is comprised of a first and second guide plate, upper and lower threaded members, connecting means, guide pins, return means and releasable lock means, said first and second guide plate having eccentric slots defined therein and being connected to each other by said connecting means so that both first and second guide plates move simultaneously, said upper and lower threaded members being of semicylindrical configuration and having defined in the inner walls thereof a thread mating said thread on said shaft, said upper and lower members being positioned between said first and second guide plates, said guide pins being secured to each of said upper and lower members and being slideably engaged with the eccentric slots in said guide, said return means urging said guide plates to rotate with respect to said upper and lower members, whereby the guide pins in cooperation with the eccentric slots cause said upper and lower members to separate and disengage the thread on said shaft, said releasable lock means being adapted to prevent rotation of said guide plates until released.

6. The apparatus according to claim 1 wherein said mounting surface rotates in a plane perpendicular to the central axis of said shaft, and a surface of said guide which is secured to said mounting surface is formed at an obtuse angle with respect to the path of movement of said cutter through said guide, said obtuse angle being selected so that when said guide is secured to said mounting surface said cutter will be guided at said predetermined angle.

7. The apparatus according to claim 1 wherein said mounting surface is adapted to rotate in an obtuse plane of rotation with respect to said central axis of said shaft, the face of said guide which is secured to said mounting surface being formed perpendicular to the path of movement of said cutter, said obtuse plane of rotation being selected so that when said guide is secured to said mounting surface said cutter will be guided at said predetermined angle.

8. The apparatus according to claim 1 wherein an elongated shaft extension is attached to said first end of said shaft, whereby said apparatus can be directly supported by support means and tapers cut on short lengths of pipe by said apparatus.

9. A portable apparatus for cutting tapers of a predetermined angle on the ends of laminated plastic pipe of a given diameter, said apparatus comprising in combination: a shaft, a collet, a pulley, a thread clamp, a tool guide, a tool holder, a cutter, manual drive means and power drive means; said shaft having first and second ends, said collet being concentrically mounted on said first end of said shaft and being adaptable to expand to a diameter sufficient to securely grip a pipe of said given diameter, the second end of said shaft having a thread defined thereon; said pulley having a rim, a web and a hub, said pulley being rotatably mounted on the shaft between said collet and said thread at a fixed distance from the first end of said shaft; said tool holder having first and second ends and being slideably engaged with said guide, said guide being secured to said web at fixed radial distance from said shaft, said tool holder passing through an aperture in said web and having its first end adjacent said collet, said cutter being secured to said first end of said tool holder, said guide in combination with said pulley and said tool holder guiding said cutter at said predetermined angle; said cutter having a plurality of pointed bits which are aligned with each other at said predetermined angle, the cutting bits immediately adjacent said first end of said tool holder being set at a negative rake angle and the final bit of said cutter being set at a positive rake angle; said fixed radial distance being selected so that said cutter will contact a pipe of said given diameter when held by said collet; said second end of said tool holder being linked with said thread clamp, said thread clamp being releasably engageable with said thread on said shaft; said manual drive means comprising attaching means, locking means, a lever and a grip, said thread clamp being releaseably engageable with said attaching means, a first end of said lever being attached to said locking means and a second end of said lever being attached to said grip, said locking means locking said lever in a plurality of positions, in the first of said positions said lever extending outward with respect to said pulley and in a second position said lever extending inward and being locked in a counterbalancing position with respect to said tool holder, guide and cutter, and said power drive means comprising a frame, motor means and transmission means, said pulley being held and adapted to rotate in said frame, said motor means being secured to said frame, said transmission means being engaged with said motor means and the rim of said pulley so that when said motor means is activated said pulley is rotated; whereby when a pipe is held by said collet and said thread clamp is engaged with said thread and the pulley is rotated by either said manual or power drive means, said cutter is rotated and advanced about said pipe at said predetermined angle cutting as it advances and rotates the taper on the end of the pipe.

References Cited

UNITED STATES PATENTS

| 1,811,894 | 6/1931 | Parker | 82—4 |
| 2,351,217 | 6/1944 | Kopp | 82—4 |
| 2,746,649 | 5/1956 | Thompson | 82—4 |

LEONIDAS VLACHOS, Primary Examiner

U.S. Cl. X.R.

144—205